US009090310B2

United States Patent
Miyashiro (10) Patent No.: US 9,090,310 B2
(45) Date of Patent: Jul. 28, 2015

(54) STRADDLE-TYPE ELECTRIC VEHICLE (71) Applicant: YAMAHA HATSUDOKI KABUSHIKI KAISHA, Iwata-shi, Shizuoka (JP)

(72) Inventor: Shidehiko Miyashiro, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/366,752

(22) PCT Filed: Dec. 17, 2012

(86) PCT No.: PCT/JP2012/082649
§ 371 (c)(1),
(2) Date: Jun. 19, 2014

(87) PCT Pub. No.: WO2013/094558
PCT Pub. Date: Jun. 27, 2013

(65) Prior Publication Data
US 2014/0345962 A1 Nov. 27, 2014

(30) Foreign Application Priority Data

Dec. 22, 2011 (JP) ................................ 2011-280757
Dec. 4, 2012 (JP) ................................ 2012-265126

(51) Int. Cl.
*B60K 1/00* (2006.01)
*B60K 7/00* (2006.01)
(Continued)

(52) U.S. Cl.
CPC ................ *B62M 7/12* (2013.01); *B60K 7/0007* (2013.01); *B60L 11/1805* (2013.01);
(Continued)

(58) Field of Classification Search
CPC .......... B60K 1/00; B60K 1/04; B60K 7/0007; B60K 2001/0405; B60K 2001/0411; B60K 2001/0416; B60K 2001/0422; B60K 2001/0427; B60K 2001/0433; B62K 2202/00; B62K 2204/00; B62M 7/12
See application file for complete search history.

(56) References Cited

U.S. PATENT DOCUMENTS 5,540,312 A * 7/1996 Ogawa et al. ............... 191/12 R
5,545,049 A    8/1996 Hasegawa et al.
(Continued)

FOREIGN PATENT DOCUMENTS

EP    2 236 403 A2    10/2010
EP    2 295 316 A2    3/2011
(Continued)

OTHER PUBLICATIONS

Official Communication issued in International Patent Application No. PCT/JP2012/082649, mailed on Feb. 19, 2013.
(Continued)

*Primary Examiner* — Joseph Rocca
*Assistant Examiner* — Marc A Scharich
(74) *Attorney, Agent, or Firm* — Keating & Bennett, LLP (57) ABSTRACT A straddle-type electric vehicle includes a seat, a foot rest portion, a leg shield, and a receptacle configured to receive a gun-type plug and located in a position facing an opening portion. The opening portion is located in a position within a width of the leg shield and between the leg shield and a rear wheel, the receptacle is configured so that a connecting port faces upward, the receptacle is configured so that when the gun-type plug is connected with the receptacle, a grip portion of the gun-type plug is positioned farther leftward on the vehicle than a plug portion of the gun-type plug.

6 Claims, 11 Drawing Sheets (51) Int. Cl.
  *B62K 11/00* (2006.01)
  *B62M 7/12* (2006.01)
  *B62K 11/10* (2006.01)
  *B62J 23/00* (2006.01)
  *B60L 11/18* (2006.01)

(52) U.S. Cl.
  CPC ........ *B60L 11/1818* (2013.01); *B60L 11/1877* (2013.01); *B62J 23/00* (2013.01); *B62K 11/10* (2013.01); *B60L 2200/12* (2013.01); *B60L 2210/30* (2013.01); *B62K 2202/00* (2013.01); *B62K 2204/00* (2013.01)

(56) References Cited

U.S. PATENT DOCUMENTS

| | | | |
|---|---|---|---|
| 6,593,721 | B1* | 7/2003 | Lin et al. .................... 320/104 |
| 8,377,608 | B2* | 2/2013 | Eguchi et al. ............... 429/515 |
| 8,746,391 | B2* | 6/2014 | Atsuchi et al. .............. 180/220 |
| 2005/0029033 | A1* | 2/2005 | Rip et al. .................... 180/220 |
| 2010/0228405 | A1* | 9/2010 | Morgal et al. ................... 701/2 |
| 2010/0252554 | A1* | 10/2010 | Eguchi et al. ............... 220/86.2 |
| 2010/0315040 | A1 | 12/2010 | Sakurai |
| 2011/0061960 | A1* | 3/2011 | Matsuoka et al. ............ 180/220 |
| 2012/0103716 | A1* | 5/2012 | Fujihara et al. ............... 180/220 |
| 2012/0175178 | A1* | 7/2012 | Iwakami et al. .............. 180/210 |
| 2012/0176086 | A1 | 7/2012 | Nakamura et al. |
| 2012/0199409 | A1 | 8/2012 | Nakamura et al. |
| 2013/0270022 | A1* | 10/2013 | Matsuda ....................... 180/220 |

FOREIGN PATENT DOCUMENTS

| | | |
|---|---|---|
| JP | 04-358980 A | 12/1992 |
| JP | 5-83863 A | 4/1993 |
| JP | 6-141407 A | 5/1994 |
| JP | 07-201408 A | 8/1995 |
| JP | 2011-063066 A | 3/2011 |
| JP | 2011-063074 A | 3/2011 |
| TW | M382921 U1 | 6/2010 |
| WO | 2011/024326 A1 | 3/2011 |

OTHER PUBLICATIONS

Official Communication issued in corresponding European Patent Application No. 12858988.4, mailed on Apr. 21, 2015.

* cited by examiner

STRADDLE-TYPE ELECTRIC VEHICLE

BACKGROUND OF THE INVENTION

1. Field of the Invention

The present invention relates to a straddle-type electric vehicle including an electric motor as a drive source.

2. Description of the Related Art

An electric motorcycle which uses an electric motor as a drive source includes a receptacle for charging a battery. When the battery is charged, a plug which is provided at an end portion of a cable which extends from a charger is connected to the receptacle.

As an electric motorcycle of this type, there is a known electric motorcycle in which a receptacle for charging the battery is provided within an accommodation box provided below a seat surface and covered by a side cover (for example, refer to Japanese Unexamined Patent Publication No. 2011-63066).

Further, recently, numerous charging stations for charging electric cars have been built. A charging station is provided with a gun-type plug including a plug portion, to which the receptacle of the electric car is connected, and a grip portion (for example, refer to Japanese Unexamined Patent Publication No. H07-201408).

Between the gun-type plug and the receptacle, it is necessary to connect plural electric wires, such as cathodes, anodes, and control signal lines. The gun-type plug is designed so that the gun-type plug is not connected with the receptacle unless a rotational position about an insertion/drawing direction of the plug matches a predetermined rotational position. Once the user grips the grip portion, the user can easily change a direction of the gun-type plug freely and easily to match the mutual rotational positions. After the rotational positions are matched with each other, by inserting the gun-type plug therein and leaving its posture as it is, the gun-type plug is electrically connected with the receptacle. Thus, the gun-type plug is easily connected.

Accordingly, it is conceivable to use the gun-type plug which is easy to connect to the electric motorcycle.

However, the receptacle of the electric motorcycle is provided at a position lower than the receptacle of an electric car. Therefore, during charging, the charging plug is left in a state in which the plug is connected with the receptacle at a lower position on the vehicle. The charging time is more than 30 minutes, and if the charging plug is located at the lower position, a user of another vehicle may overlook the charging plug and may contact the charging plug unintentionally, for example.

SUMMARY OF THE INVENTION

Preferred embodiments of the present invention provide a straddle-type electric vehicle that uses the gun-type plug which is easily connected and also significantly reduces or prevents an adverse influence on the surroundings during charging.

According to a preferred embodiment of the present invention, a straddle-type electric vehicle includes a front wheel and a rear wheel; a seat at least a portion of which is disposed farther forward than the rear wheel; a body cover including a foot rest portion located between the front wheel and the rear wheel and configured to support feet of an occupant seated on the seat from below, and a leg shield located between the foot rest portion and the front wheel and which includes a surface extending in an up-and-down direction; and a receptacle configured to receive a gun-type plug including a plug portion and a grip portion and which is arranged to face an opening portion; wherein the opening portion is located on the body cover in a position which is within a width of the leg shield in a left-and-right direction of the vehicle and between the leg shield and the rear wheel in a front-and-rear direction of the vehicle, the receptacle is configured so that a connection port to which the gun-type plug is inserted faces upward, and the receptacle is configured so that at least a portion of the grip portion of the gun-type plug is positioned farther leftward on the vehicle than the plug portion of the gun-type plug when the gun-type plug is connected with the receptacle.

According to a preferred embodiment of the straddle-type electric vehicle, the receptacle is located in a position which is within a width of the leg shield in the left-and-right direction of the vehicle, between the leg shield and the rear wheel in the front-and-rear direction, and in a position facing the opening portion. The connection port faces upward. The receptacle is configured so that at least a portion of the grip portion of the gun-type plug is positioned farther leftward on the vehicle than the plug portion when the gun-type plug is connected with the receptacle. Thus, even for the straddle-type vehicle in which the receptacle is arranged in a lower position, the occupant who gets off the left side of the vehicle connects the gun-type plug with the receptacle, and thus the connecting work is easy.

The gun-type plug including the plug portion and the grip portion is connectable with the receptacle. The opening portion which the receptacle faces is provided in a space which is within the width of the leg shield in the left-and-right direction of the vehicle and between the leg shield and the rear wheel in the front-and-rear direction which is a space in which the occupant rests his/her foot normally. Thus, even in a case that the connecting work of the gun-type plug is easy, the space in which the occupant rests his/her foot normally is utilized, and the amount of the gun-type plug protruding sidewards is significantly reduced when the gun-type plug is connected with the receptacle.

According to a preferred embodiment of the present invention, the work of connecting the gun-type plug with the receptacle is easy and there is little concern that another vehicle contacts with the plug during charging and, thus, the straddle-type electric vehicle significantly reduces its adverse influence on the surroundings.

In the straddle-type electric vehicle according to a preferred embodiment of the present invention, the receptacle is preferably configured so that a grip portion of a gun-type plug extends obliquely with respect to a left-and-right direction of the vehicle when the gun-type plug is connected with the receptacle.

According to a preferred embodiment of the straddle-type electric vehicle, the grip portion does not extend leftward of the vehicle directly, but extends obliquely. Thus, the amount of the gun-type plug protruding sideward of the vehicle is further reduced. Accordingly, it is further reduced such that another vehicle contacts with the gun-type plug during charging.

Further, in the straddle-type electric vehicle according to a preferred embodiment of the present invention, the receptacle is preferably located farther forward than the seat, and the receptacle is configured so that at least a portion of a grip portion of a gun-type plug is positioned rearward and diagonally leftward on the vehicle with respect to a plug portion of the gun-type plug when the gun-type plug is connected with the receptacle.

According to a preferred embodiment of the straddle-type electric vehicle, the gun-type plug connected with the receptacle does not interfere with the seat. Thus, there is provided a straddle-type electric vehicle in which the connecting work of the gun-type plug to the receptacle is easy.

Further, in the straddle-type electric vehicle according to a preferred embodiment of the present invention, the receptacle is preferably located farther rearward than the foot rest portion, and the receptacle is configured so that at least a portion of a grip portion of a gun-type plug is positioned forward and diagonally leftward on the vehicle with respect to a plug portion of the gun-type plug when the gun-type plug is connected with the receptacle.

According to a preferred embodiment of the straddle-type electric vehicle, the gun-type plug connected with the receptacle does not interfere with the seat. Thus, there is provided a straddle-type electric vehicle in which the connecting work of the gun-type plug to the receptacle is easy.

Further, in the straddle-type electric vehicle according to a preferred embodiment of the present invention, the receptacle is preferably configured so that at least a portion thereof is positioned farther rightward than a vehicle center.

According to a preferred embodiment of the straddle-type electric vehicle, the entire gun-type plug is accommodated within the width of the leg shield in the left-and-right direction of the vehicle. Thus, there is provided a straddle-type electric vehicle in which the adverse influence on the surroundings is further reduced or prevented.

Further, in the straddle-type electric vehicle according to a preferred embodiment of the present invention, the straddle-type electric vehicle preferably includes a cover portion which is provided between the leg shield and the seat and above the foot rest portion, and at least a portion thereof is positioned between left and right foot rest portions in a width direction of the vehicle in a plan view and the opening portion is provided on the cover portion.

According to a preferred embodiment of the straddle-type electric vehicle, the gun-type plug is preferably disposed between the left and right foot rests and there is provided a straddle-type electric vehicle in which an adverse influence on the surroundings is further reduced or prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 6A-6C are enlarged side view of the receptacle, wherein FIG. 6A shows a state in which a cap is closed, FIG. 6B shows a state in which the cap is opened, and FIG. 6C shows a state in which the gun-type plug is connected.

FIGS. 7A-7C are enlarged side views of the receptacle of a straddle-type electric vehicle according to a second preferred embodiment of the present invention, wherein FIG. 7A shows a state in which a cap is closed, FIG. 7B shows a state in which the cap is opened, and FIG. 7C shows a state in which the gun-type plug is connected thereto.

FIGS. 11A and 11B show a straddle-type electric vehicle according to a fifth preferred embodiment of the present invention, wherein FIG. 11A is a side view and FIG. 11B is a top view of the receptacle.

DETAILED DESCRIPTION OF THE PREFERRED EMBODIMENTS

The inventors of the present invention focused on a gun-type plug which is easy to change its direction freely by gripping a grip portion thereof, to match mutual rotational positions, and to insert into a receptacle after matching the mutual rotational positions. The inventors of the present invention considered applying a gun-type plug which is easily connected to a straddle-type electric vehicle to enhance the convenience of the users.

However, the inventors of the present invention discovered that because the gun-type plug includes a plug portion and a grip portion, a size of the plug is large and, when applying the gun-type plug thereto, the following problem may occur.

The receptacle on the straddle-type electric vehicle is generally provided at a position lower than that of a receptacle on an electric motorcycle. Further, when mounting the receptacle on the straddle-type electric vehicle, the gun-type plug tends to protrude outward of the vehicle during charging. Furthermore, because the straddle-type electric vehicle is small relative to an electric car, it is able to be parked in a narrow space between neighboring straddle-type vehicles.

For this reason, during charging with the gun-type plug, when other straddle-type electric vehicles attempt to park in the narrow space neighboring the straddle-type electric vehicle which is being charged, the gun-type plug is overlooked and the other vehicle unintentionally contacts the gun-type plug. Thus, there is a concern that the charging may be interrupted.

The inventors of the present invention provide a straddle-type electric vehicle in which the convenience of the user is enhanced by using the gun-type plug in which there is no concern of contacting other vehicles during charging.

Note that the above problem does not occur with an electric motorcycle that does not use the gun-type plug as disclosed in Japanese Unexamined Patent Publication No. 2011-63066. This is because, in Japanese Unexamined Patent Publication No. 2011-63066, the plug is small and a space in which the plug is inserted is assured under a seat cover of the vehicle. As such, the plug is inserted under the seat cover, and the plug does not protrude outward of the vehicle. For this reason, the above problem does not occur in an electric motorcycle which does not use the gun-type plug.

Figure 1:
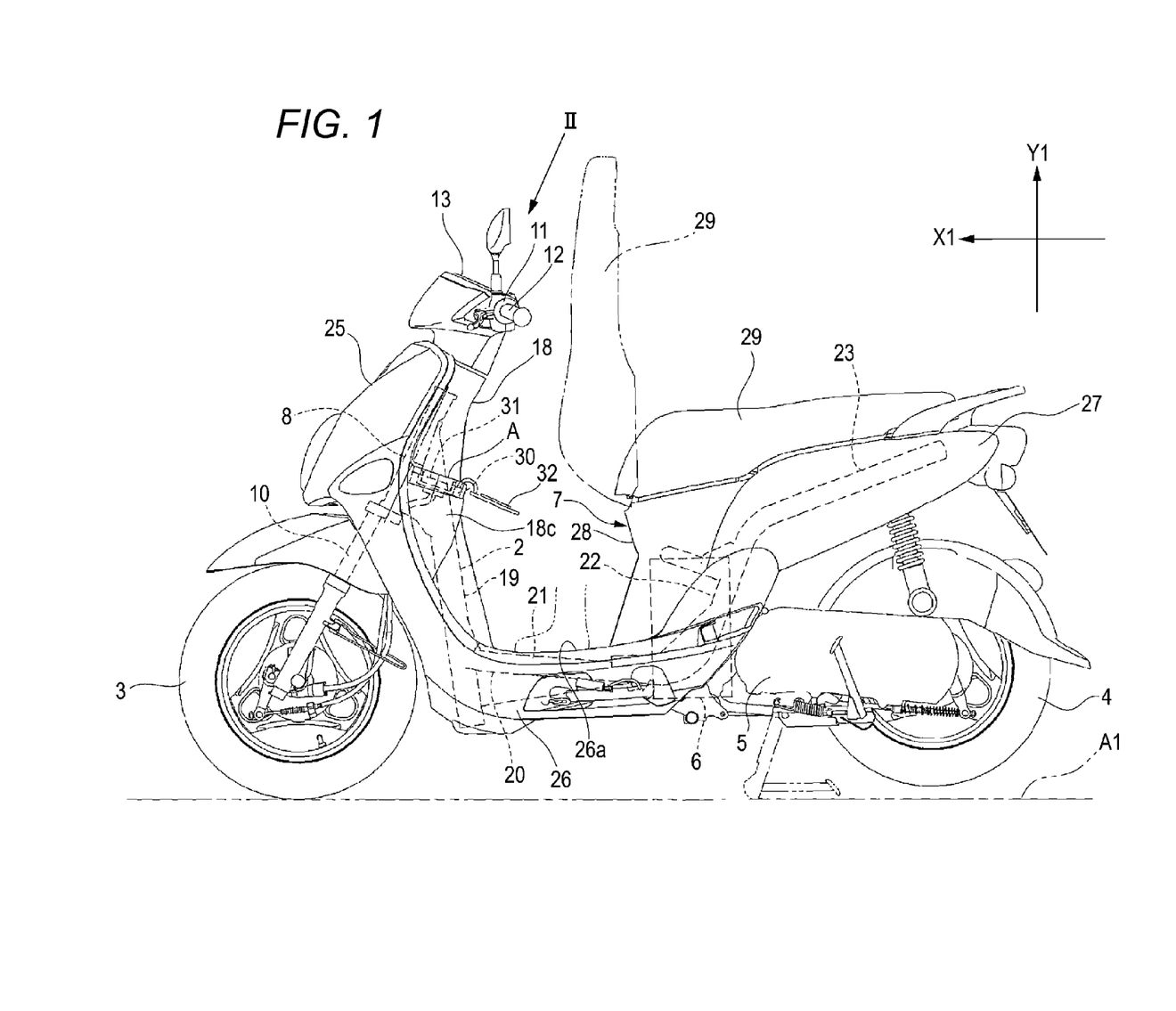
FIG. 1 is a side view of a straddle-type electric vehicle according to a first preferred embodiment of the present invention.
Figure 2:
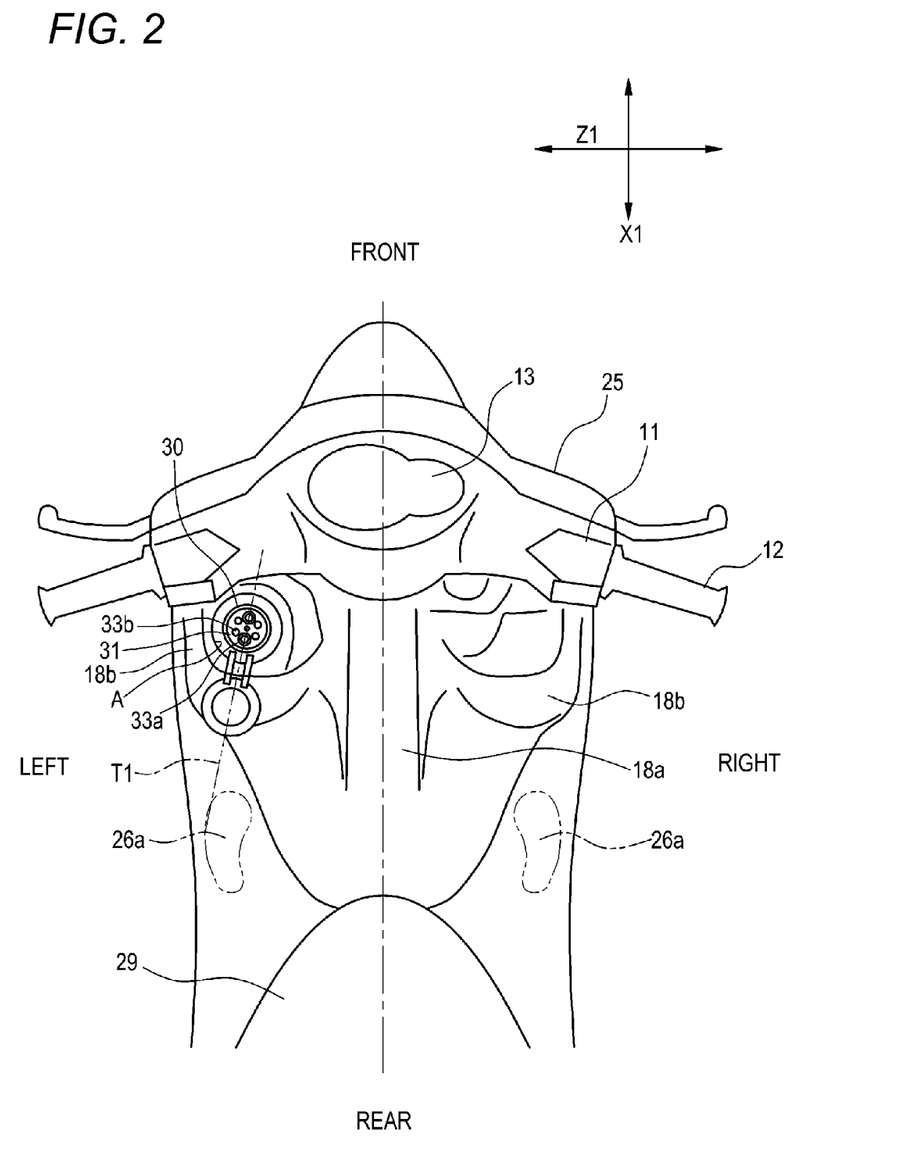
FIG. 2 is an enlarged top view of the vicinity of a receptacle of the straddle-type electric vehicle shown in FIG. 1 as viewed in a direction indicated by an arrow II.

Hereinafter, referring to the drawings, preferred embodiments of the present invention will specifically be described. FIG. 1 is a left side view of a straddle-type electric motorcycle according to a first preferred embodiment of the present invention. FIG. 2 is an enlarged top view of the vicinity of receptacle of the straddle-type electric vehicle shown in FIG. 1 as viewed in a direction indicated by an arrow II.

It is noted that in the following description, directions denoted as front, rear, top, bottom, left, and right are based on a viewing direction of a rider who rides on an electric motorcycle disposed on a horizontal plane, and who faces a forward traveling direction. In FIG. 1, a front direction is denoted by an arrow X1 and an up-and-down direction is denoted by an arrow Y1. In FIG. 2, a left-and-right direction is denoted by an arrow Z1. In addition, the configuration of the electric motorcycle will be described based on the electric motorcycle parked in an upright state with a main stand rotated downward.

The electric motorcycle includes a body frame 2, a front wheel 3, a rear wheel 4, a power unit 5 including an electric motor, a battery 6, a body cover 7, and a seat 29. In the electric motorcycle, the electric motor is driven by electric power supplied from the battery 6, and the rear wheel 4 is driven by an output of the electric motor. Hereinbelow, an overall construction of the electric motorcycle will be described sequentially from the front of a body thereof.

The electric motorcycle includes a head pipe 8 disposed at a top front portion of the electric motorcycle. A steering shaft is turnably inserted into the head pipe 8. A front fork 10 is mounted at a lower end portion of the steering shaft. The front wheel 3 is mounted to the front fork 10.

A handlebar 11 is mounted at an upper end portion of the steering shaft. The rider is able to turn the steering shaft, the front forks 10, and the front wheel 3 about an axis of the steering shaft by controlling the handlebar 11.

Grips 12 are provided individually at both left and right end portions of the handlebar 11 (a left grip only is shown). A right-hand grip includes a throttle grip. The rider is able to turn this throttle grip to control an output of the electric motor. Additionally, a meter 13 is provided near a center of the handlebar 11.

The electric motorcycle includes the body frame 2 which extends rearward from the head pipe 8. The body frame 2 includes steel tube members. The body frame 2 includes a down tube 19 and a frame main body 20 disposed rearward of the down tube 19. The down tube 19 extends rearward and diagonally downward from a lower portion of the head tube 8. As viewed from the side thereof, the frame main body 20 extends rearward from a lower end portion of the down tube 19, and an intermediate portion of the down tube 19 in the front-and-rear direction X1 of the vehicle has an S-shape.

The frame main body 20 includes a pair of left and right frame main bodies 20, each frame main body 20 including a first frame portion 21, a second frame portion 22, and a third frame portion 23.

The first frame portion 21 extends straight or substantially straight rearward from the lower end portion of the down tube 19 and is slightly inclined rearward and diagonally upward. A side stand is mounted to the first frame portion 21.

The second frame portion 22 has an S-shape as viewed from the side thereof. The second frame portion 22 is curved from bottom to top. A front end of the second frame portion 22 extends from a rear end portion of the first frame portion 21, an intermediate portion of the second frame portion 22 extends straight rearward and diagonally upward, and a rear end portion thereof extends to the third frame portion 23. When viewed from the side thereof, an inclination angle of the intermediate portion of the second frame portion 22 relative to the first frame portion 21 is, for example, on the order of about 45 degrees, for example. The third frame portion 23 extends in a straight line from an upper end portion of the second frame portion 22 and is inclined rearward and diagonally upward.

As shown in FIG. 1, the electric motorcycle includes the body cover 7 which is mounted on the body frame 2. The body cover 7 includes a front cover 25 which covers the head pipe 8, a leg shield 18, a bottom cover 26, a rear cover 27, and an under-seat cover 28. The body cover 7 is a cover that defines an outer surface of the electric motorcycle.

The bottom cover 26 extends rearward from a lower portion of the front cover 25 to cover the first frame portion 21. Foot rest portions 26a are provided at an upper end portion of the bottom cover 26 which is provided between the front wheel 3 and the rear wheel 4. The foot rest portions 26a are flat or substantially flat and support the feet of the rider seated on the seat 29 from below.

The leg shield 18 is provided between the foot rest portions 26a and the front wheel 3 and includes a surface which extends in the up-and-down direction. This leg shield 18 covers the down tube 19 together with the front cover 25. The leg shield 18 extends from the rear side of the front cover 25 to the foot rest portions 26a.

As shown in FIG. 2, the leg shield 18 includes a frame covering portion 18a at a center in the left-and-right direction of the vehicle and leg protecting portions 18b which are provided at the left and right of the frame covering portion 18a. The leg protecting portions 18b are provided individually at left and right end portions of the leg shield 18 so as to protect the legs of the rider seated on the seat 29. The frame covering portion 18a has a shape such that it projects rearward from the leg protecting portions 18b so as to cover the down tube 19 which extends rearward and diagonally downward from the head tube 8.

Additionally, as shown in FIG. 1, the rear cover 27 covers the second frame portion 22 and the third frame portion 23. The rear cover 27 has an overall shape which extends rearward and diagonally upward from a rear portion of the bottom cover 26. The rear cover 27 covers from an intermediate portion of the second frame portion 22 to the third frame portion 23 from the left and right sides thereof.

The under-seat cover 28 extends upward from the rear portion of the bottom cover 26 to below the seat 29 and at the front of the rear cover 27.

The seat 29 is disposed above the under-seat cover 28 and the rear cover 27. A front portion of the seat 29 is located farther forward than the rear wheel 4. While the electric motorcycle is running, the feet of the rider seated on the seat 29 rest on the foot rest portions 26a. In the front-and-rear direction X1, the foot rest portions 26a are disposed between the leg shield 18 and the under-seat cover 28.

Additionally, the seat 29 is mounted on the under-seat cover 28 via a hinge at a front portion thereof, such that a storage space provided below the seat 29 can be opened and closed by the seat 29.

The battery 6, which functions as a power supply for the electric motor, is disposed below the seat 29. The battery 6 is disposed between the pair of left and right second frame portions 22. The battery 6 is a secondary battery which is rechargeable. It is noted that the battery 6 may be configured so as to be detached from the vehicle.

In addition, the power unit 5 is provided farther rearward than the first frame portion 21 and below the third frame portion 23. The power unit 5 is mounted on the third frame portion 23 so as to swing via a suspension unit. A main stand is mounted at a lower portion of the power unit 5.

In the electric motorcycle configured in the manner described above, a receptacle 30 which is electrically connected with the battery 6 is provided between the front cover 25 and the leg shield 18. The receptacle 30 includes a connecting port 31 into which a plug portion 42 of a gun-type plug 40, described below, can be inserted. The receptacle 30 is configured so that the connecting port 31 faces an opening portion A provided in the leg shield 18. The receptacle 30 may be fitted to a down tube 19 or may be fitted to the body cover 7.

Further, a cap 32 is provided on the receptacle 30 so as to close the connecting port 31. When charging is not carried out, the cap 32 covers the connecting port 31 to prevent the intrusion of rain water or dust into an interior of the receptacle 30.

As shown in FIG. 2, a receptacle accommodating portion 18c is arranged on the left-side leg protecting portion 18b of the leg shield 18 so as to project rearward from the leg protecting portion 18b. An upper surface of the receptacle accommodating portion 18c defines a flat plane or a substantially flat plane facing upward. The opening portion A is provided in the receptacle accommodating portion 18c.

That is, the opening portion A is provided in a position which is within a width of the leg shield 18 in a left-and-right direction Z1 of the vehicle. Further, the receptacle 30 faces the opening portion A and is provided in an interior of the receptacle accommodating portion 18c in a state that the connecting port faces upward.

The receptacle 30 preferably includes seven male terminals 33a, 33b, for example. The seven male terminals 33a, 33b are exposed in the connecting port 31. In the connecting port 31, the seven male terminals 33a, 33b are provided at vertex positions of a regular hexagon and a center position.

The male terminals 33a, 33b are respectively connected with two direct current power lines (cathode and anode), an earth line, two interface lines, and two communication lines. The interface line electrically detects the connection between the gun-type plug 40 and the receptacle 30. The communication line communicates control signals between a battery charger connected to the gun-type plug 40 and the battery 6 connected to the receptacle 30.

Of the seven male terminals 33a, 33b, the two male terminals 33a are thicker than the other four male terminals 33b. The two thicker male terminals 33a are, as shown, arranged in the front-and-rear direction of the vehicle. In detail, as viewed from the top of the vehicle in FIG. 2, the rearward male terminal 33a is located farther leftward than the forward male terminal 33a.

Note that, in the following descriptions, for convenience of explanation, a direction indicated by a line segment connecting the two thicker male terminals 33a in FIG. 2 is called as a receptacle-side terminal arrangement direction T1. Namely, the receptacle-side terminal arrangement direction T1 is slanted rearward and diagonally leftward with respect to the front-and-rear direction X1 of the vehicle.

Figure 3:
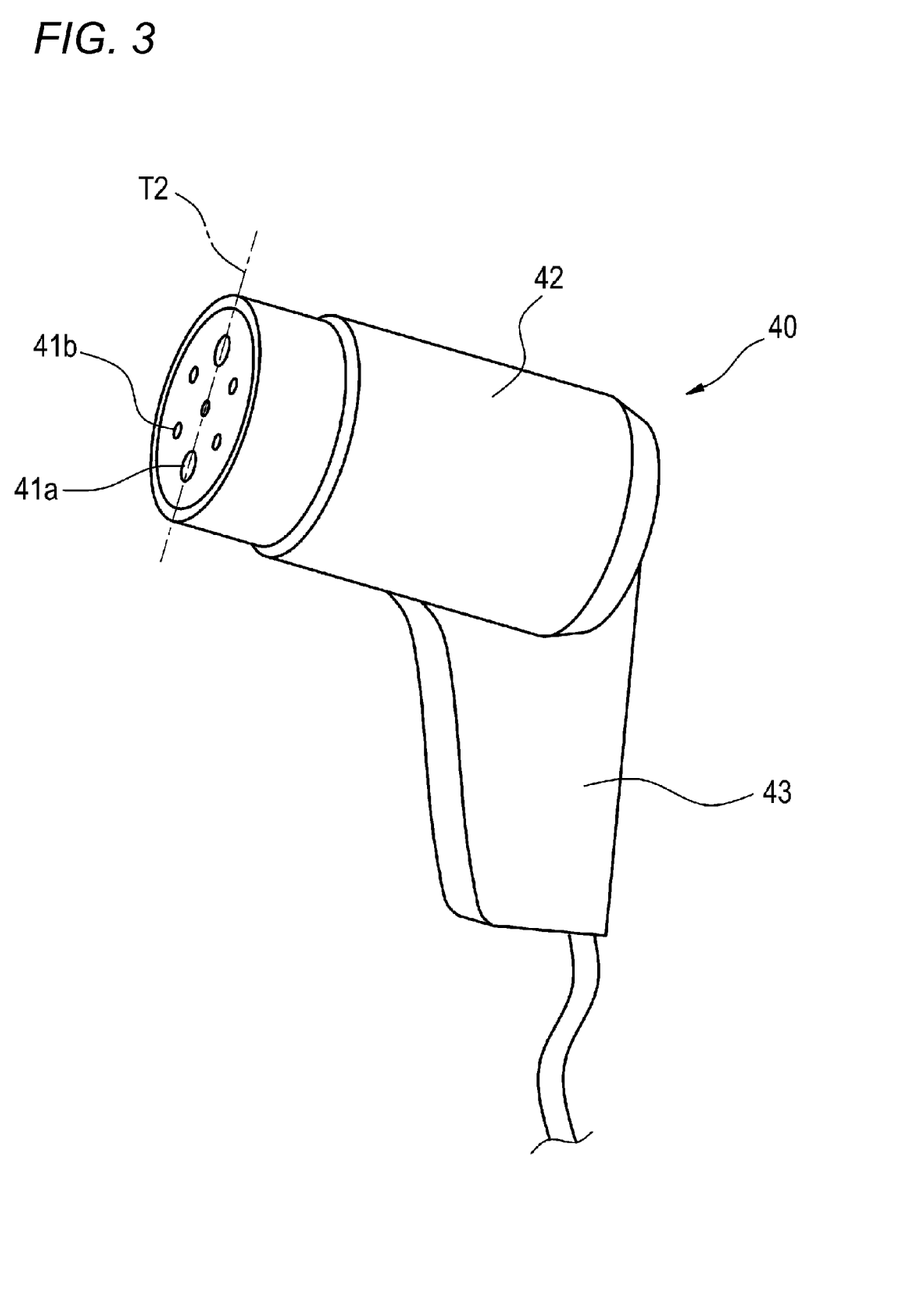
FIG. 3 is a perspective view of a gun-type plug which is connectable to the receptacle shown in FIG. 2.

FIG. 3 is a perspective view showing the gun-type plug 40 which is connectable to the receptacle 30. The gun-type plug 40 includes a plug portion 42 including female terminals 41a, 41b which are to be connected to the male terminals 33a, 33b of the receptacle 30, and a grip portion 43 which is used as a handle.

The plug portion 42 is cylindrical and extends along an insertion direction to the receptacle 30. In an interior of the plug portion 42, a plurality (seven in the shown example) female terminals 41a, 41b are arranged so as to extend in a longitudinal direction of the plug portion 42. The female terminals are exposed to a tip of the plug portion 42.

Further, the seven female terminals 41a, 41b are respectively provided in vertex positions of a regular hexagon and a center position. Of the seven female terminals 41a, 41b, the two female terminals 41a are thicker than the other four female terminals 41b. A direction indicated by a line segment connecting the two thicker female terminals 41a is called a plug-side terminal arrangement direction T2.

Further, the grip portion 43 extends diagonally rearward with respect to the plug portion 42 so as to be slanted with respect to the longitudinal direction of the plug portion 42. The grip portion 43 protrudes from the plug portion 42 in the plug-side terminal arrangement direction T2. For this reason, when the user handles the gun-type plug 40, a direction of the gun-type plug 40 is naturally determined so that the grip portion 43 is positioned lower than the plug portion 42. In this direction, the two thicker female terminals 41a, 41b are arranged in the up-and-down direction and the plug-side terminal arrangement direction T2 becomes the up-and-down direction.

Figure 4:
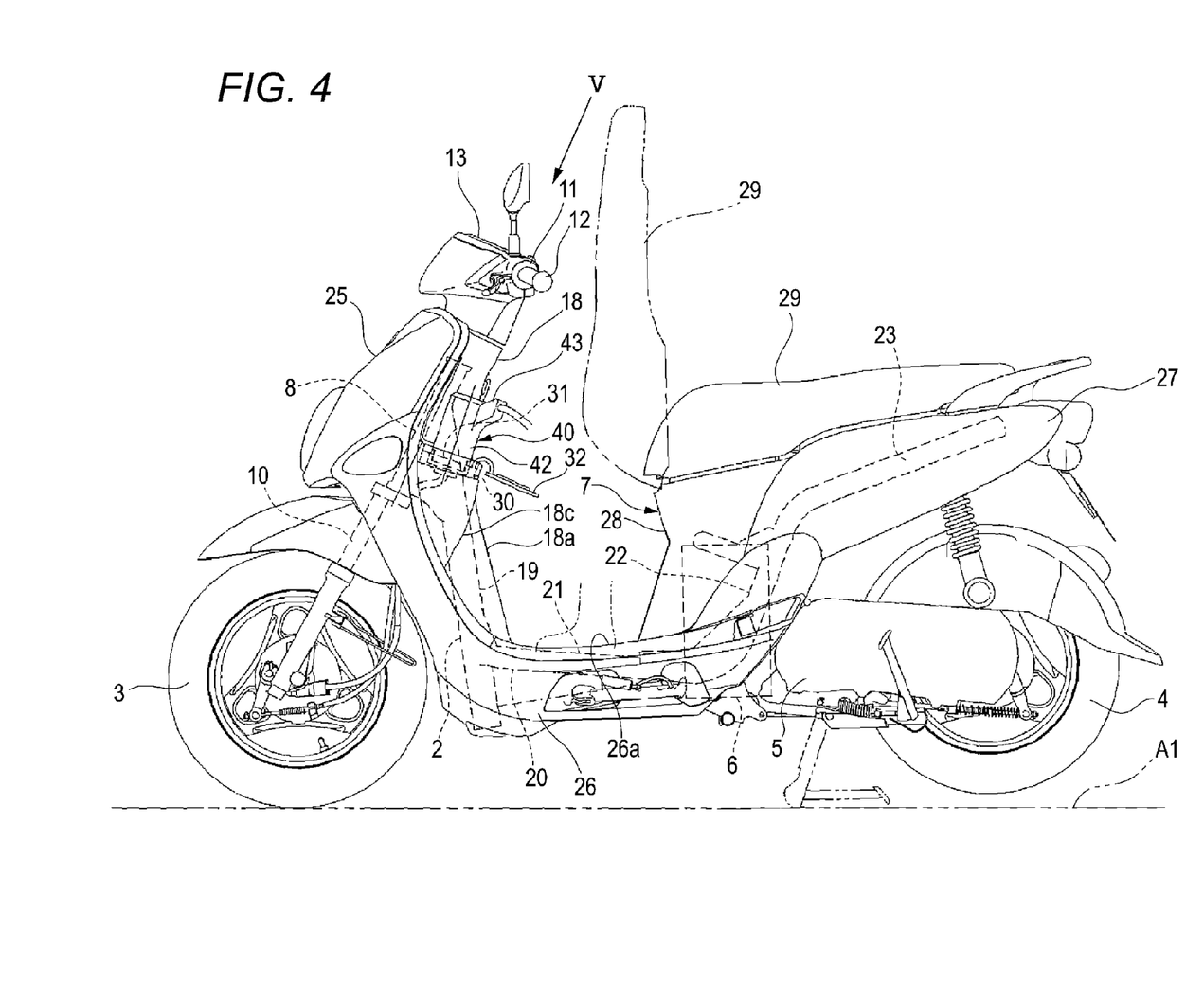
FIG. 4 is a side view of the straddle-type electric vehicle shown in FIG. 1 showing a state in which the gun-type plug is connected thereto.
Figure 5:
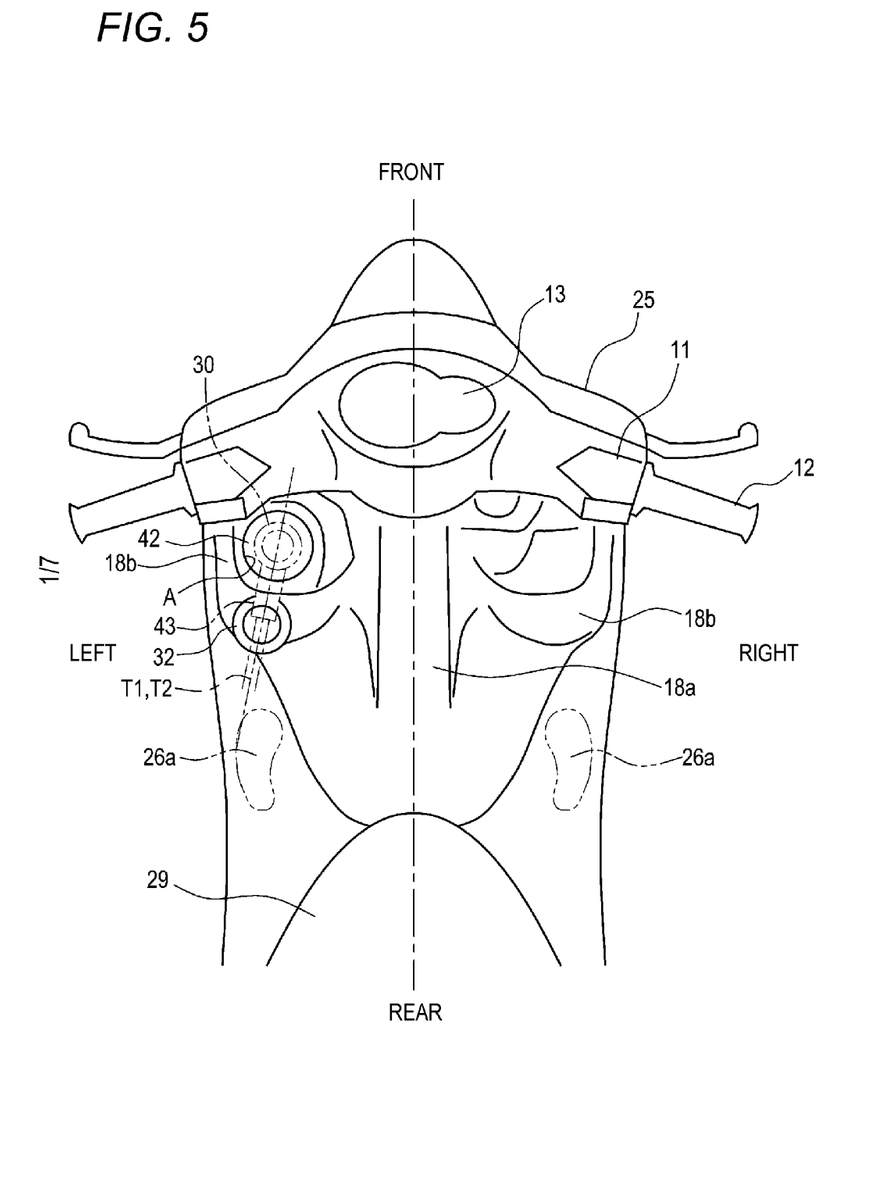
FIG. 5 is a top view of the straddle-type electric vehicle shown in FIG. 4 as viewed in a direction indicated by an arrow V showing a state in which the gun-type plug is connected thereto.

FIG. 4 is a side view showing a state in which the gun-type plug 40 is connected with the receptacle 30. FIG. 5 is a top view as viewed from an arrow V in FIG. 4 showing the state in which the gun-type plug 40 is connected with the receptacle 30. In the electric motorcycle according to the present preferred embodiment, the gun-type plug 40 is connected with the receptacle 30 to charge the battery 6.

As shown in FIG. 4, when the gun-type plug 40 is connected with the receptacle 30, because the connecting port 31 of the receptacle 30 faces upward, a rear end of the plug 42 of the gun-type plug 40 protrudes upward.

Further, as shown in FIG. 5, the grip portion 43 is located leftward of the plug portion 42. This is because the receptacle 30 is configured so that the receptacle terminal arrangement direction T1 is slanted rearward and diagonally to the left with respect to the front-and-rear direction of the vehicle. For this reason, the gun-type plug 40 is inserted into the receptacle 30 in a posture in which the grip portion 43 is farther leftward than the plug portion 42 so that the plug-side terminal arrangement direction T2 matches the receptacle-side terminal arrangement direction T1.

As such, the receptacle 30 is configured so that, when the gun-type plug 40 is connected with the receptacle 30, at least a portion of the grip portion 43 is positioned farther leftward on the vehicle than the plug portion 42. For this reason, there is no concern that the gun-type plug 40 interferes with the leg shield 18 and, thus, connecting the gun-type plug 40 is easy.

Further, as shown in FIG. 5, the entire gun-plug 40 is accommodated in a space which is within a width of the leg shield 18 in the left-and-right direction Z1 of the vehicle, between the leg shield 18 and the rear wheel 4 in the front-and-rear direction of the vehicle, and at which the foot of the occupant seated on the seat 29 at the time of driving is located. Therefore, an amount of the gun-type plug 40 which protrudes sideward of the vehicle is prevented. In particular, in the present preferred embodiment, the grip portion 43 of the gun-type plug 40 does not protrude sideward from this space and, thus, there is no concern of adverse influences from the surroundings during charging.

The space in which the leg of the occupant is located is originally empty to accommodate the leg of the occupant. During charging, the occupant does not sit on the seat 29 and the space is available to accommodate the gun-type plug. Therefore, it is not necessary to provide additional space to accommodate the gun-type plug 40, and the limited space on the electric motorcycle is effectively utilized.

Note that the space in which the leg of the occupant is located does not mean only the space in which the leg of the occupant exists in the riding state, but also includes the space in which the leg passes when the occupant gets on and off the vehicle. That is, the space above the foot rest portions 26a and the space between the left and right foot rest portions 26a is used as the space in which the gun-type plug 40 is accommodated during charging. In this case, it is unnecessary to provide additional space to accommodate the gun-type plug 40.

In the electric motorcycle according to the present preferred embodiment, in a state in which the gun-type plug 40 is connected with the receptacle 30, the grip portion 43 is positioned rearward and diagonally to the left with respect to the plug portion 42 of the gun-type plug 40. The user who performs the charging stands in the vicinity of the seat 29 at the left side of the vehicle.

At this time, the user holds the gun-type plug 40 so that the grip portion 43 is positioned at a side close to his/her body and the plug portion 42 is positioned at a side farther away from his/her body. Accordingly, when the user brings the gun-type plug 40 close to the receptacle 30, naturally, the grip portion 43 is positioned farther rearward and diagonally to the left than the plug portion 42. Thus, connecting the gun-type plug 40 to the receptacle 30 is easy.

Figure 6A:
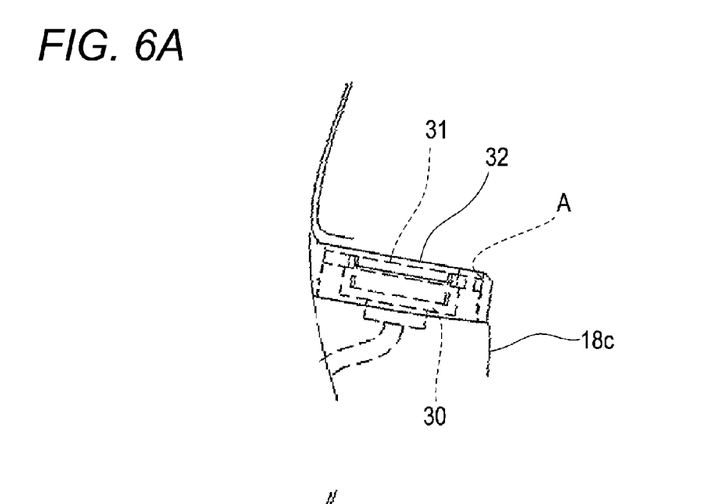
Figure 6B:
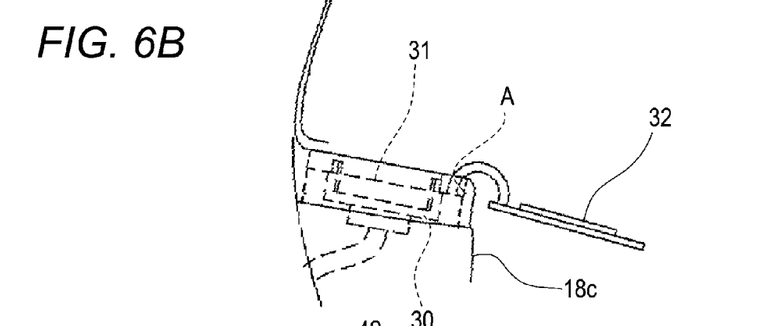
Figure 6C:
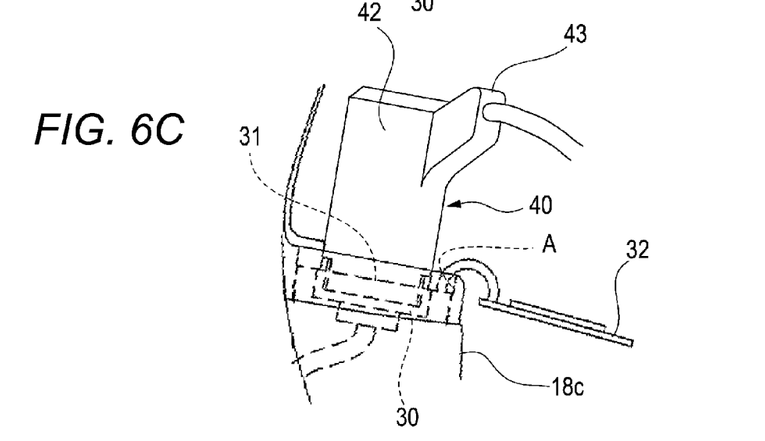

FIGS. 6A-6C are enlarged side views of the receptacle 30, wherein FIG. 6A shows a state in which a cap 32 is closed, FIG. 6B shows a state in which the cap 32 is opened, and FIG. 6C shows a state in which the gun-type plug 40 is connected thereto.

In the present preferred embodiment, as shown in FIG. 6C, the gun-type plug 40 is connected with the receptacle 30 so that the plug portion 42 extends rearward and diagonally upward of the receptacle 30. For this reason, the user connects the gun-type plug 40 to the receptacle 30 by inserting the gun-type plug 40 into the receptacle 30 from a top of the vehicle in the forward and diagonally upward direction. Accordingly, the user who performs the charging stands in the vicinity of the seat 29 can easily recognize the connecting port and, thus, the connecting work is easy.

Further, in the present preferred embodiment, the opening portion A is provided in the body cover 7 which defines the outer surface of the electric motorcycle. Thus, compared with a case where the receptacle is provided below the seat, access to the receptacle from outside of the vehicle is easy and charging is easy.

Furthermore, because the opening portion A is provided in the body cover 7, the gun-type plug 40 is located at a position near the outer surface of the vehicle during charging. However, according to the above preferred embodiments, the amount of the gun-type plug 40 which protrudes sideward of the vehicle is significantly reduced. Therefore, it is prevented from adversely affecting the surroundings during charging. According to the preferred embodiments, an electric motorcycle in which charging is easy, and adverse influence of the gun-type plug on the surroundings during charging is significantly reduced.

Figure 7A:
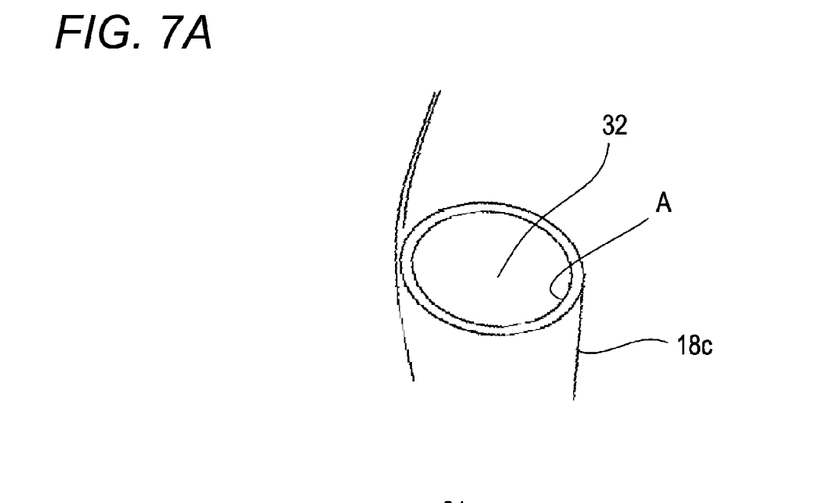
Figure 7B:
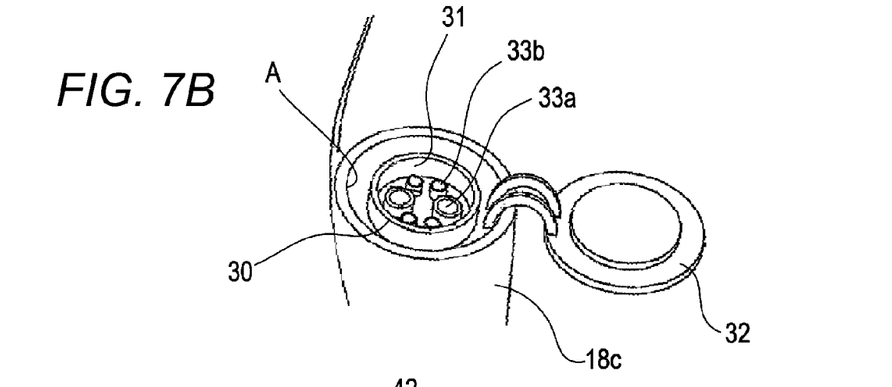
Figure 7C:
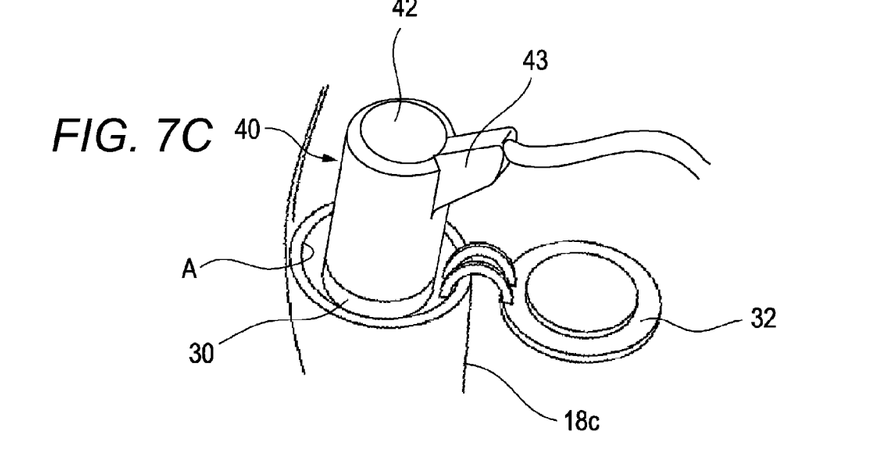

Note that an opening direction of the connecting port 31 of the receptacle 30 may be designed in a manner according to a second preferred embodiment shown in FIGS. 7A-7C. FIGS. 7A-7C are enlarged side views of a receptacle 30 of a straddle-type electric vehicle according to the second preferred embodiment of the present invention. FIG. 7A shows a state in which a cap 32 is closed, FIG. 7B shows a state in which the cap 32 is opened, and FIG. 7C shows a state in which the gun-type plug 40 is connected thereto.

As shown in FIGS. 7A-7C, the connecting port 31 of the receptacle 30 may be opened rearward, diagonally upward, and slanted leftward. According to this configuration, the user who stands to the left side of the vehicle and performs the charging can easily recognize the connecting port 31 and bring the gun-type plug 40 close to the receptacle 30 in a proper posture. Further, the user can insert the gun-type plug 40 into the receptacle 30 easily.

Figure 8:
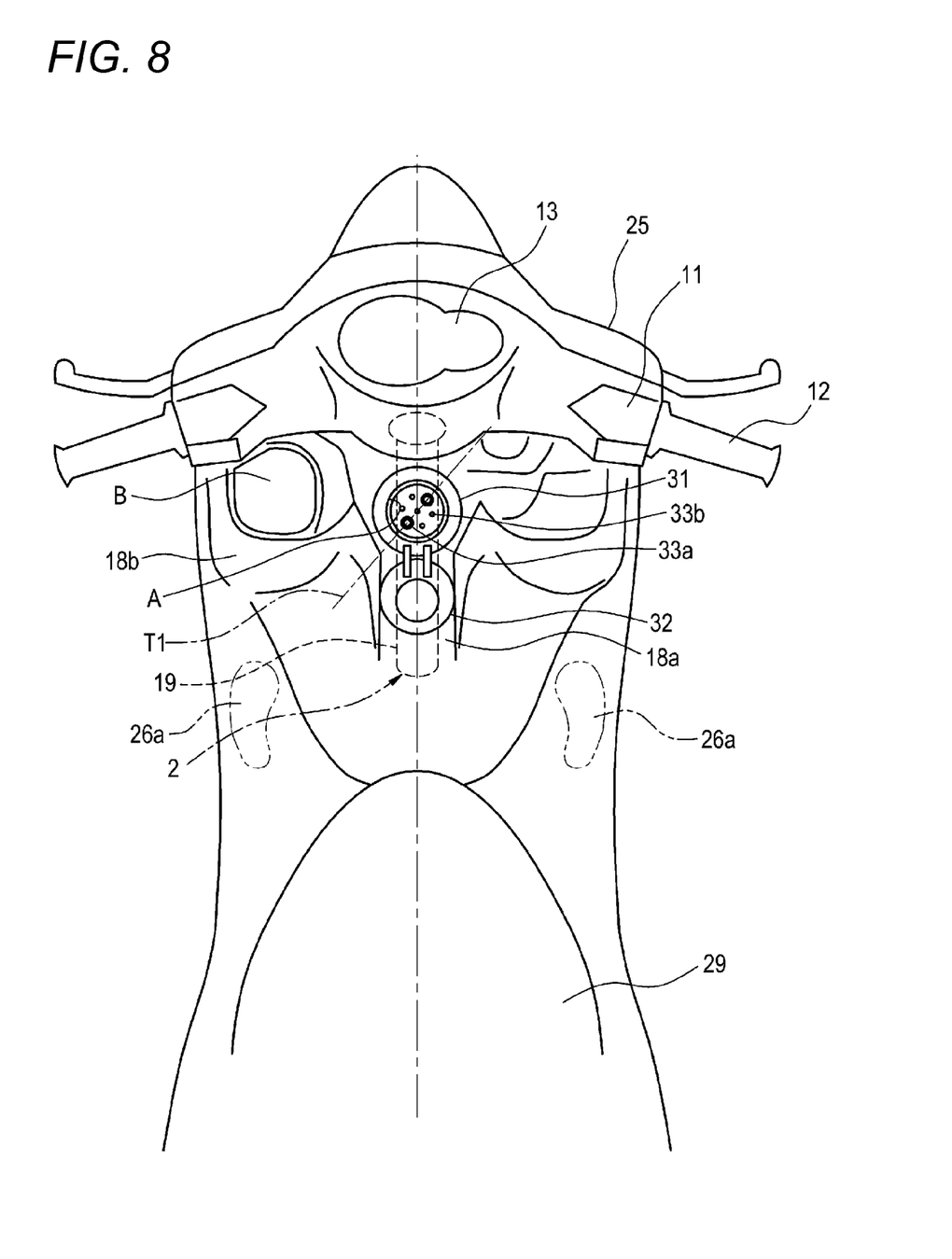
FIG. 8 is a top view of a straddle-type electric vehicle according to a third preferred embodiment of the present invention.
Figure 9:
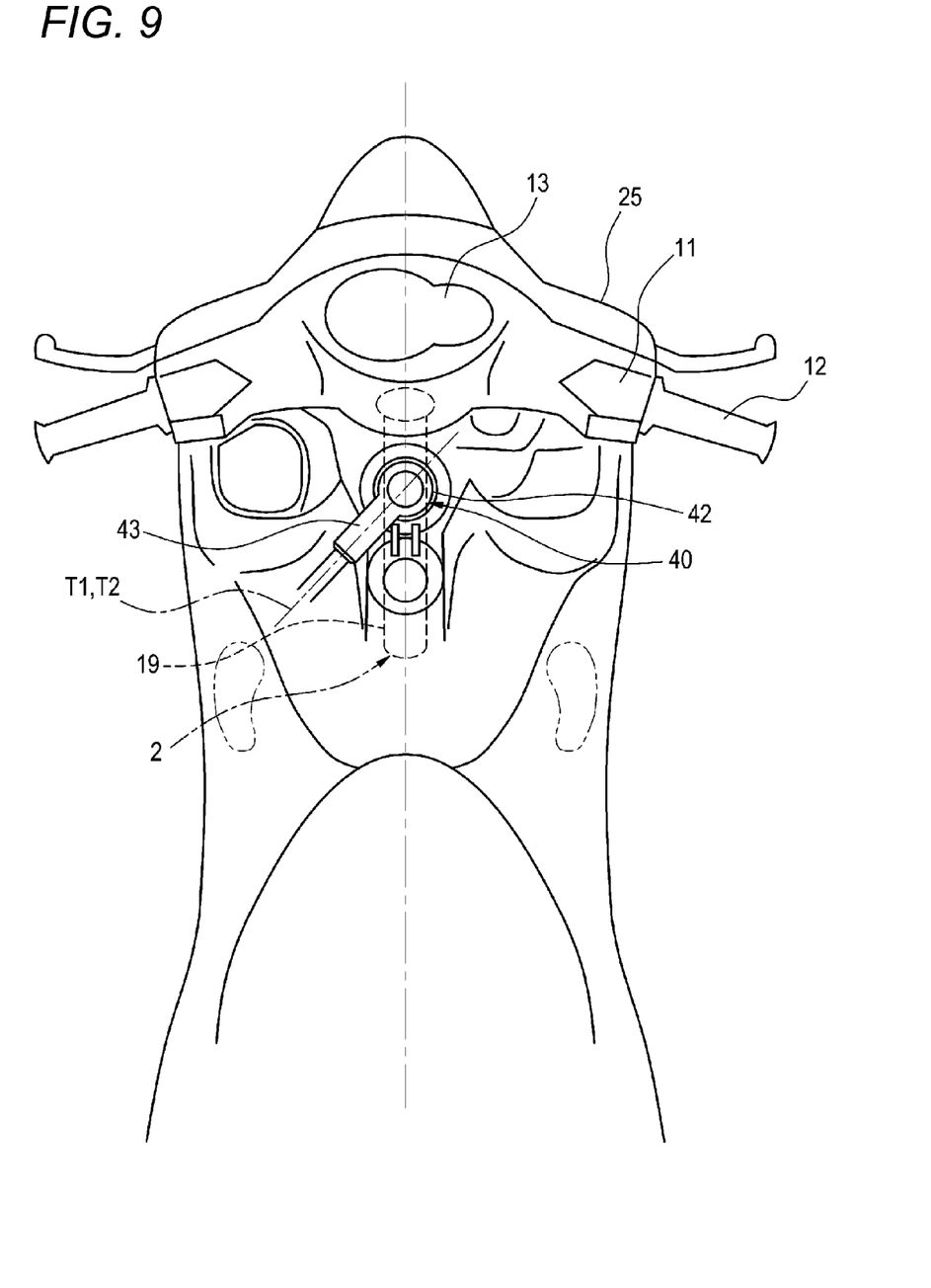
FIG. 9 is a top view showing a state in which the gun-type plug is connected with the receptacle of the straddle-type electric vehicle shown in FIG. 8.

Note that in the above description, an example in which the receptacle 30 is preferably provided leftward of the leg shield 18 is disclosed. However, the present invention is not limited thereto. FIG. 8 is a top view of a straddle-type electric vehicle according to a third preferred embodiment of the present invention. FIG. 9 shows a configuration in which the gun-type plug 40 is connected with the receptacle 30 shown in FIG. 8. As shown in FIGS. 8 and 9, the receptacle 30 is provided in a frame covering portion 18a of the leg shield 18.

The frame covering portion 18a is positioned between the leg shield 18 and the seat 29 and above the foot rest portions (refer to FIG. 1). Further, as shown in FIG. 8, in a plan view, at least a portion of the frame covering portion 18a is positioned between the left and right foot rest portions 26a in a width direction of the vehicle. The opening portion A is provided in the frame covering portion 18. For this reason, at least a portion (right half) of the receptacle 30 which faces the opening portion A is positioned farther rightward than a center of the vehicle.

For this reason, the entire gun-type plug 40 can be placed right next to the vehicle. Therefore, according to the configuration of the present preferred embodiment, the grip portion 43 of the gun-type plug 40 more surely does not protrude to the side of the vehicle. Further, a space to the left side of the leg shield can be used as a small article accommodation space.

Figure 10:
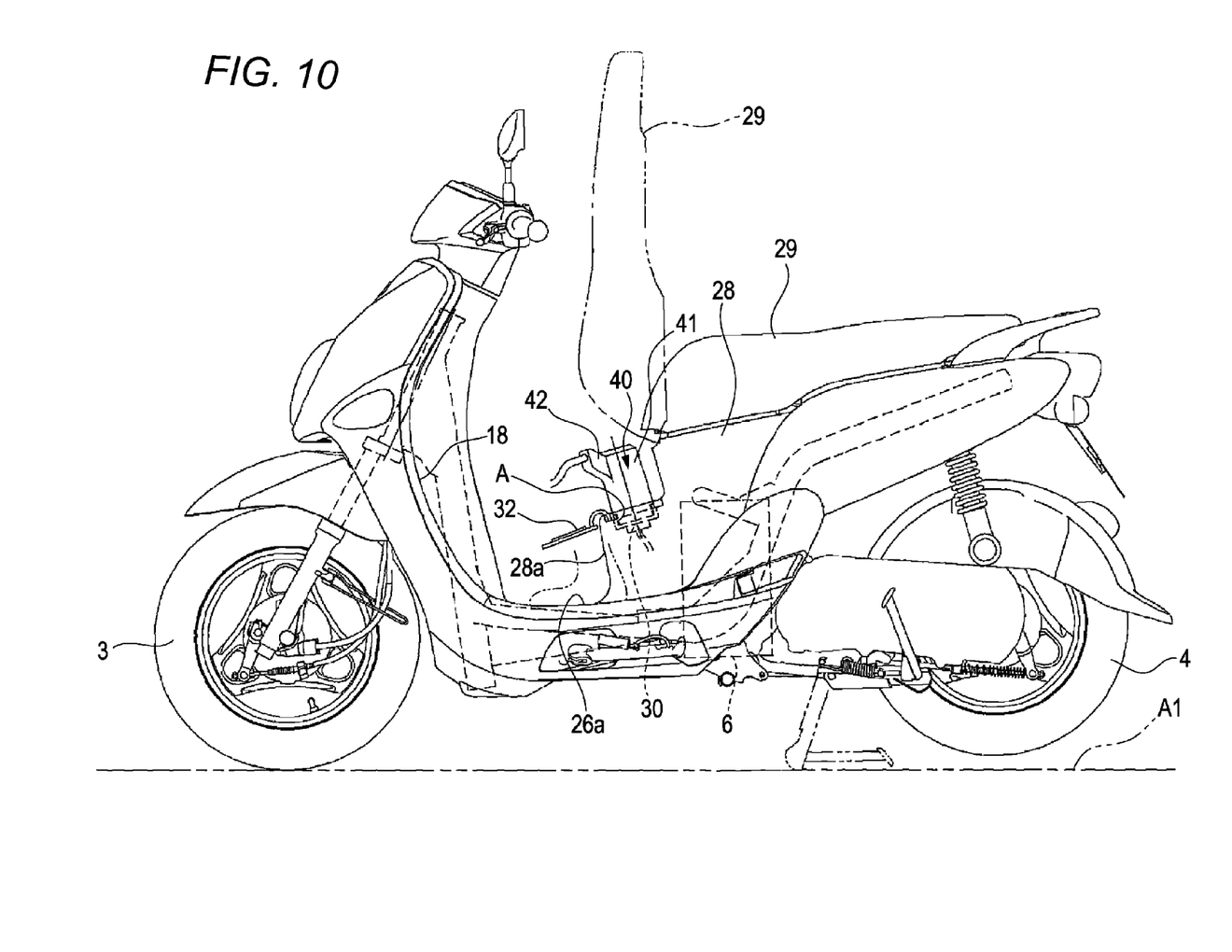
FIG. 10 is a side view of a straddle-type electric vehicle according to a fourth preferred embodiment of the present invention.

Further, in the first through third preferred embodiments, examples in which the opening portion A to which the connecting port 31 of the receptacle 30 faces is provided in the leg shield 18 are disclosed. However, the present invention is not limited thereto. The opening portion A may be provided at a position which is within the width of the leg shield in the left-and-right direction Z1 of the vehicle and between the leg shield 18 and the rear wheel 4 in the front-and-rear direction X1 of the vehicle. FIG. 10 is a side view of a straddle-type electric vehicle according a fourth preferred embodiment of the present invention.

As shown in FIG. 10, the opening portion A is provided in the under-seat cover 28. The under-seat cover 28 of the electric motorcycle according the present preferred embodiment is provided with a step portion 28a protruding forward under the seat 29. The opening portion A is provided on a flat upper surface of the step portion 28a.

In this preferred embodiment, too, when the gun-type plug 40 is connected with the receptacle 30, the grip portion 43 of the gun-type plug 40 is positioned forward and diagonally leftward of the plug 42. For this reason, there is no concern that the gun-type plug 40 will interfere with the seat 29, and the connecting work is easy. Further, because it is prevented for the gun-type plug 40 from protruding sideward of the vehicle at the time of charging, adverse influences on the surroundings is significantly reduced or prevented.

Figures 11A, 11B:
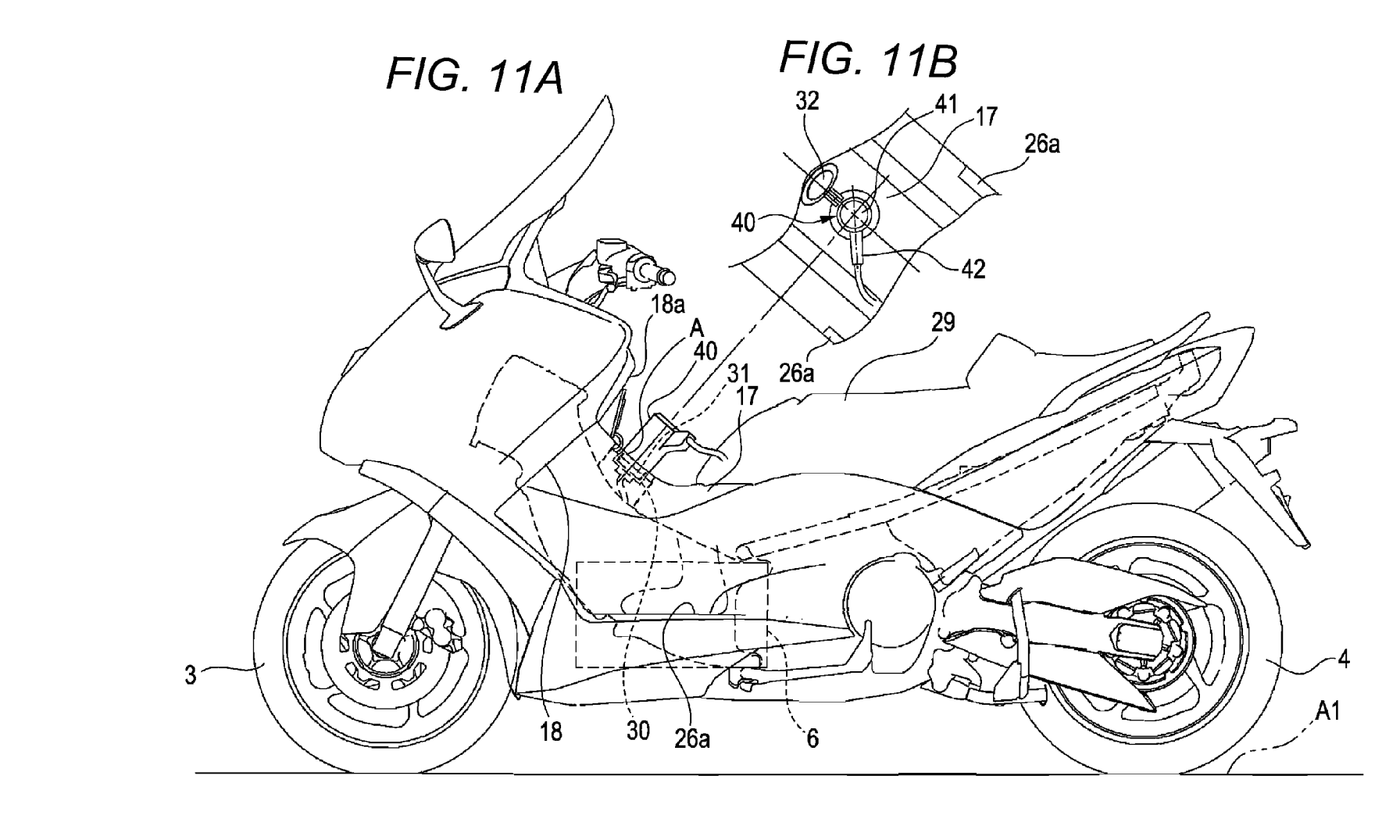

In the above first through fourth preferred embodiments, examples in which the space on which the legs of the occupant is provided forward of the seat 29 are disclosed. However, the present invention is not limited thereto. FIG. 11 shows an electric vehicle according to a fifth preferred embodiment of the present invention, wherein (a) is a side view and (b) is a top view showing the receptacle.

As shown in (a) of FIG. 11, a tunnel portion 17 is provided between the frame covering portion 18a which is provided at a center in a left-and-right direction of the leg shield 18 and the seat 29. The tunnel portion 17 is positioned between the leg shield 18 and the seat 29 and above the foot rest portions. Further, as shown in (b) of FIG. 11, in a plan view, at least a portion of the tunnel portion 17 is positioned between the left and right foot portions 26a in the width direction of the vehicle. The opening portion A which the connecting port 31 of the receptacle 30 faces is provided on an upper surface of the tunnel portion 17. The receptacle 30 is provided in an interior of the tunnel portion 17 so that the connecting port 31 opens upward.

As shown in (b) of FIG. 11, the receptacle is provided so that the grip portion 43 is positioned farther leftward on the vehicle than the plug portion 42 when the gun-type plug 40 is connected with the receptacle 30. Note that the tunnel portion 17 is positioned within the width direction of the leg shield 18 in the left-and-right direction.

According to this configuration, because the opening portion A is provided at a center of the width direction of the vehicle, when charging the battery 6 the gun-type plug 40 is prevented from protruding to the side of the vehicle. Thus, there is no concern in which the gun-type plug 40 contacts other vehicles, and adverse influences on the surroundings are significantly reduced or prevented.

In the above first through fifth preferred embodiments, the board-shaped foot rest portions 26 preferably are provided on the body cover 7. However, the present invention is not limited thereto. For an example, the foot rest portion may be a rod-shaped metal member.

Further, examples in which the connecting port 31 of the receptacle 30 is closable by the cap 32 attached to the receptacle are disclosed. However, the present invention is not limited thereto. A configuration in which the cap is attached to the leg shield 18, the under-seat cover 28, or the tunnel portion 17 on which the opening portion A is provided may be used.

In the above preferred embodiments, examples in which the gun-type plug 40 includes seven male terminals 33a, 33b and the receptacle 30 includes seven female terminals 41a, 41b are disclosed. However, the present invention is not limited thereto. For example, a configuration may be used in which the communication lines are designed to have a function of that of the interface line too, and the gun-type plug 40 includes five male terminals 33a, 33b and the receptacle 30 includes five female terminals 41a, 41b so that five electric wires are connected.

In addition, various design alterations can be made within the scope of matters described in claims.

This patent application is based on Japanese Patent Application No. 2011-280757 filed on Dec. 22, 2011 and Japanese Patent Application No. 2012-265126 filed on Dec. 4, 2012, the entire contents of which are incorporated herein by reference.

According to the preferred embodiments of the present invention, a straddle-type electric vehicle permits a gun-type plug to be provided in the space between the left and right foot rest portions, and the influence on the surroundings is significantly reduced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A straddle-type electric vehicle comprising:
   a front wheel and a rear wheel;
   a seat at least a portion of which is disposed farther forward than the rear wheel;
   a body cover including:
      a foot rest portion located between the front wheel and the rear wheel and configured to support feet of an occupant seated on the seat; and
      a leg shield provided between the foot rest portion and the front wheel and which includes a surface extending in an up-and-down direction; and
   a receptacle configured to receive a gun plug including a plug portion and a grip portion, the receptacle being arranged to face an opening portion in the body cover; wherein
   the opening portion is provided in the body cover at a position which is within a width of the leg shield in a left-and-right direction of the vehicle and between the leg shield and the rear wheel in a front-and-rear direction of the vehicle;
   the receptacle is configured so that a connection port of the receptacle to which the gun plug is electrically connected faces upward; and
   the receptacle is configured so that at least a portion of the grip portion of the gun plug is positioned farther leftward on the vehicle than the plug portion of the gun plug when the gun plug is electrically connected with the receptacle.

2. The straddle-type electric vehicle according to claim 1, wherein the receptacle is configured so that the grip portion of the gun plug extends obliquely with respect to the left-and-right direction of the vehicle when the gun plug is electrically connected with the receptacle.

3. The straddle-type electric vehicle according to claim 2, wherein the receptacle is located farther forward than the seat, and the receptacle is configured so that at least a portion of the grip portion of the gun plug is positioned rearward and diagonally leftward on the vehicle with respect to the plug portion of the gun plug when the gun plug is electrically connected with the receptacle.

4. The straddle-type electric vehicle according to claim 2, wherein the receptacle is arranged farther rearward than the foot rest portion, and the receptacle is configured so that at least a portion of the grip portion of the gun plug is positioned forward and diagonally leftward on the vehicle with respect to the plug portion of the gun plug when the gun plug is electrically connected with the receptacle.

5. The straddle-type electric vehicle according to claim 1, wherein the receptacle is configured so that at least a portion of the receptacle is positioned rightward of a vehicle center.

6. The straddle-type electric vehicle according to claim 1, wherein the body cover further includes:
   a cover portion arranged between the leg shield and the seat and above the foot rest portion, the foot rest portion includes a left foot rest portion and a right foot rest portion, and at least a portion of the cover portion is positioned between the left foot rest portion and the right foot rest portion in the left-and-right direction of the vehicle in a plan view; and
   the opening portion is provided in the cover portion.

* * * * *